(12) United States Patent
Saw

(10) Patent No.: US 6,459,815 B1
(45) Date of Patent: Oct. 1, 2002

(54) METHOD OF BUFFERING VIDEO DATA IN VIDEO COMPRESSION SYSTEM

(75) Inventor: Yoo Sok Saw, Kyungki-do (KR)

(73) Assignee: LG Information & Communications, Ltd., Seoul (KR)

(*) Notice: Subject to any disclaimer, the term of this patent is extended or adjusted under 35 U.S.C. 154(b) by 0 days.

(21) Appl. No.: 09/224,801

(22) Filed: Dec. 31, 1998

(30) Foreign Application Priority Data

Oct. 10, 1998 (KR) .............................. 98-43089

(51) Int. Cl.[7] ................................ G06K 9/46
(52) U.S. Cl. ..................... 382/246; 382/251; 382/250; 382/244; 382/248
(58) Field of Search .................. 382/232, 233, 382/234, 235, 239, 241, 242, 244, 245, 246, 250; 348/700, 845, 394, 395, 403, 405, 408, 413–415, 441, 444; 364/514; 358/133, 140, 141, 135, 142; 375/240.24, 240.26, 240.23; 370/535, 497, 522, 487–489, 498; 709/230, 236, 232, 251

(56) References Cited

U.S. PATENT DOCUMENTS

| | | | | |
|---|---|---|---|---|
| 5,111,292 A | * | 5/1992 | Kuriacose et al. | 358/133 |
| 5,122,875 A | * | 6/1992 | Raychaudhuri et al. | 358/133 |
| 5,379,351 A | * | 1/1995 | Fandrianto et al. | 382/41 |
| 5,541,852 A | * | 7/1996 | Eyuboglu et al. | 364/514 |
| 5,822,024 A | * | 10/1998 | Setogawa et al. | 348/845 |
| 5,920,572 A | * | 7/1999 | Washington et al. | 370/535 |
| 6,018,366 A | * | 1/2000 | Asai et al. | 348/394 |
| 6,226,328 B1 | * | 5/2001 | Assuncao | 375/240.26 |
| 6,266,702 B1 | * | 7/2001 | Darnell et al. | 709/236 |

* cited by examiner

Primary Examiner—Phuoc Tran
Assistant Examiner—Amir Alavi
(74) Attorney, Agent, or Firm—Fleshner & Kim, LLP (57) ABSTRACT

A method of buffering video data in a video compression system, in which a video bit stream, compressed on the basis of an international standard, is transmitted adaptively to a state of a transmission channel under a digital communication environment where a transmission speed is very low and a bit error generation rate is very high. The video data buffering method comprises the step of performing a discrete orthogonal transform operation with respect to input video data in the unit of blocks and storing the resultant coefficients in the unit of discrete orthogonal transform components.

48 Claims, 7 Drawing Sheets

FIG.1

FIG.2 serial input/serial output

METHOD OF BUFFERING VIDEO DATA IN VIDEO COMPRESSION SYSTEM

BACKGROUND OF THE INVENTION

1. Field of the Invention

The present invention relates to a method of buffering video data in a video compression system, and more particularly to a buffering method for transmitting a video bit stream compressed on the basis of an international standard.

2. Description of the Prior Art

In the international standardization of mobile communication techniques centering around a wideband code division multiplexing access (W-CDMA) technique, a mobile video data communication standard has been proposed recently by a recommendation of the International Telecommunications Union Telecommunications Standard (hereinafter "ITU-T") on a television transmission line and audio broadcast transmission line.

In such international standards on the mobile video data communication, a video buffering technique is commonly used.

The video buffer temporarily stores the compression-coded variable-rate video data for a predetermined time period prior to outputting the data at a rate matching the communication channel. If a communication channel is a variable bit rate (VBR) type in which data is processed regardless of a variation in the rate of compressed video data, no buffering is required. However, in most wire/wireless digital communications, the communication channels have a constant bit rate (CBR). As a result, a video buffering technique capable of controlling the variable-rate video data adaptively to a constant-bit rate communication channel is required.

Also, even in the case where a communication channel is the variable bit rate type, a network is congested upon inputting video data of a rate higher than the maximum variable rate of the communication channel. In order to prevent such a congestion, a video buffering technique which limits the rate of video data or a rate control technique similar thereto is required.

Figure 1:
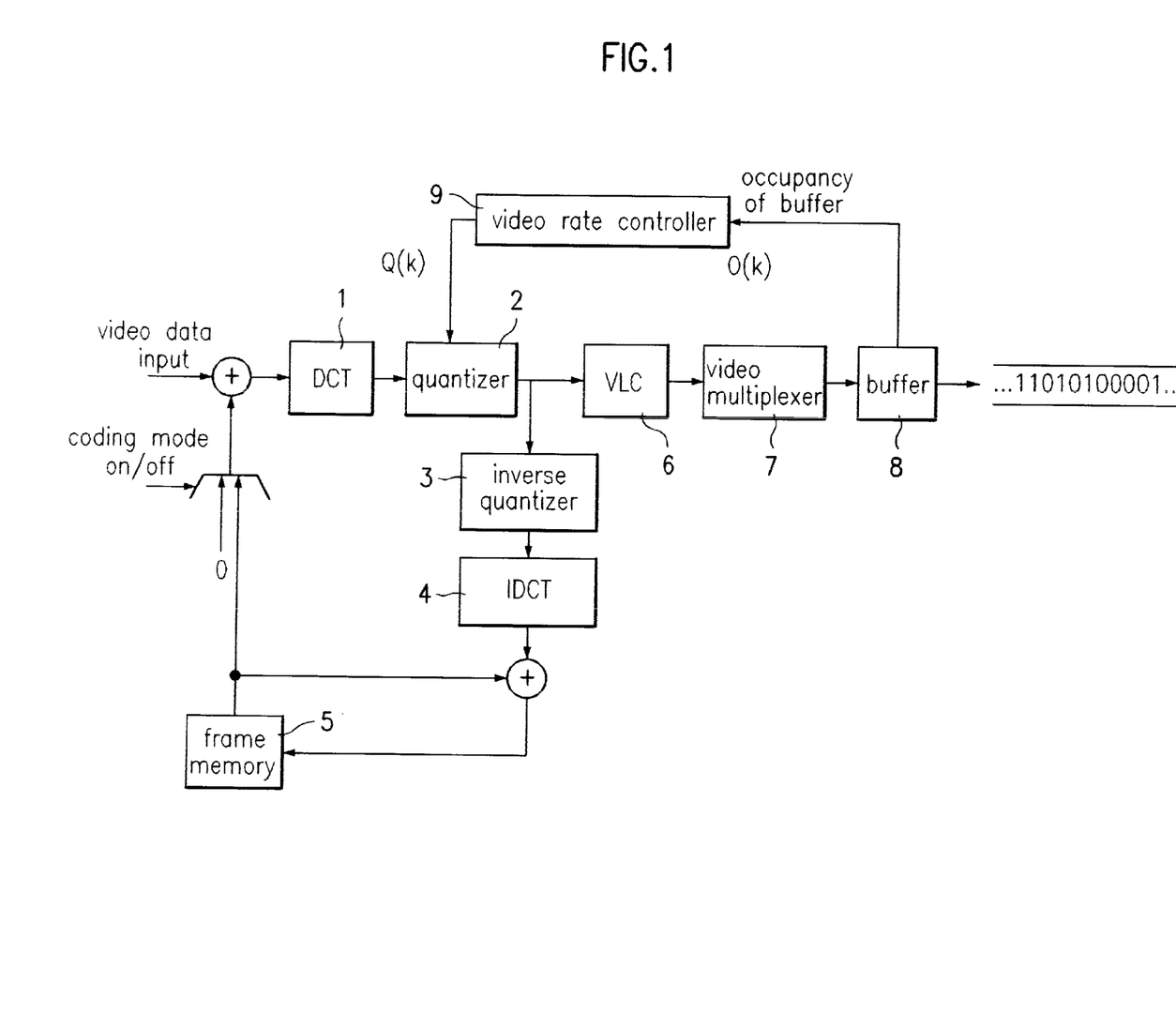
FIG. 1 is a block diagram of a conventional video data compression apparatus.

FIG. 1 is a block diagram showing a conventional video data compression apparatus in the related art. This video data compression apparatus is a basic model defined in an international standard on video compression coding, or ITU-T H.263, MPEG-1, MPEG-2 and MPEG-4. As shown in FIG. 1, the video data compression apparatus comprises a discrete cosine transform (DCT) unit 1 inputting macro block-unit video data before compression, a quantizer 2, an inverse quantizer 3, an inverse discrete cosine transform (IDCT) 4, and a frame memory 5 for video storage. The video data compression apparatus further comprises a variable length coder (VLC) 6 converting video data quantized by the quantizer 2 into variable-length data, a video multiplexer 7 multiplexing the variable-length codes from the VLC 6, and a buffer 8 transmitting the compressed video data from the video multiplexer 7 externally via the channel.

The buffer 8 acts as a single port for input/output of video data. The buffer 8 has an occupancy which is periodically monitored on the basis of an address difference between a read pointer and a write pointer. Also, the buffer 8 notifies a video rate controller 9 coupled with the quantizer 2 of the monitored occupancy. The buffer 8 forms a feedback loop with the video rate controller 9. Also, the buffer 8 inputs the compressed variable-rate variable-length video data and outputs constant-rate variable-length video data.

The video rate controller 9 judges the occupancy O (k) of the buffer 8 and transfers a proper quantization coefficient Q (k) to the quantizer 2 according to the judged result.

The quantization coefficient Q (k) is a quantization step size of any one of 31 integers from 1 to 31. When the quantization coefficient Q (k) is large, the amount of output data from the quantizer 2 is reduced. If the quantization coefficient Q (k) is small, the amount of output data from the quantizer 2 is increased.

Figure 2:
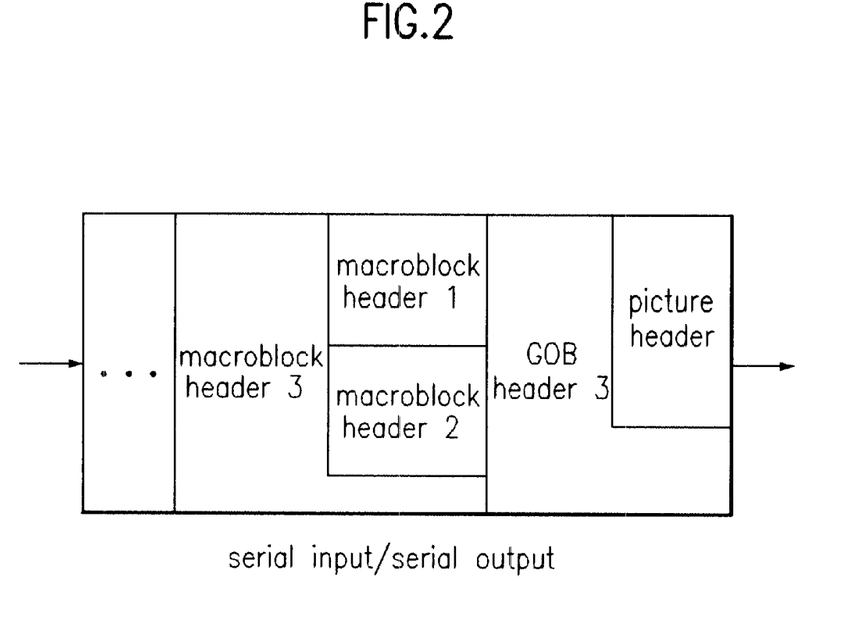
FIG. 2 is a view showing an internal structure of a buffer in FIG. 1.

Variable-rate and variable-length video data, compression-coded by the quantizer 2, the VLC 6 and the video multiplexer 7, are serially input to the buffer 8. From the buffer 8, the data is serially output at a constant-rate variable-length video data in the input order. FIG. 2 shows an internal structure of a conventional buffer 8 in FIG. 1.

As shown in FIG. 2, the conventional buffer is configured in a first-in first-out (FIFO) manner where compressed video data are serially input and output in the input order. Such a FIFO memory is subjected to a serial input/output control operation which does not allow a random access operation. This FIFO memory usually has functional pins usable to indicate an occupancy full or occupancy empty state.

In the conventional buffer as discussed above, an overflow or underflow may occur due to a difference between the amounts of input/output data because it employs a FIFO memory with a serial input/output function. Also, because the step size of the quantizer is a main factor for controlling the data amounts, the buffer may perform a faulty operation even under a correct control. In particular, upon occurrence of an overflow, the buffer is unable to store new input video data, resulting in a disconnection with a communication channel. Recovering of the connection requires resynchronization and a considerable amount of processing time.

The above problem may be compensated by increasing the size of the buffer to reduce the faulty operation rate thereof. However, this causes a transfer delay, resulting in a degradation in service quality.

Another issue is to prevent a degradation in picture quality when the flow amount to the buffer is increased due to an abrupt increase in the video data amount. To minimize the degradation effect, the degradation in the picture quality should be distributed to the surroundings. However, because variation cannot be applied to video data previously stored in the buffer, the picture quality degradation appears mostly on new input video data. This causes an abrupt variation in picture quality and thus, a degradation in service quality.

SUMMARY OF THE INVENTION

Accordingly, an object of the present invention is to solve at least the problems and disadvantages of the related art.

An object of the present invention is to provide a buffering of video data in a video compression system, in which the memory locations are divided according to variable-length elements to define the boundary between input variable-length codes in order to permit individual accesses.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a video data buffering in a video compression system comprises the step of performing a discrete orthogonal transform operation with respect to the input video data in the block units and storing the resultant coefficients in the unit of discrete orthogonal transform components.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 3:
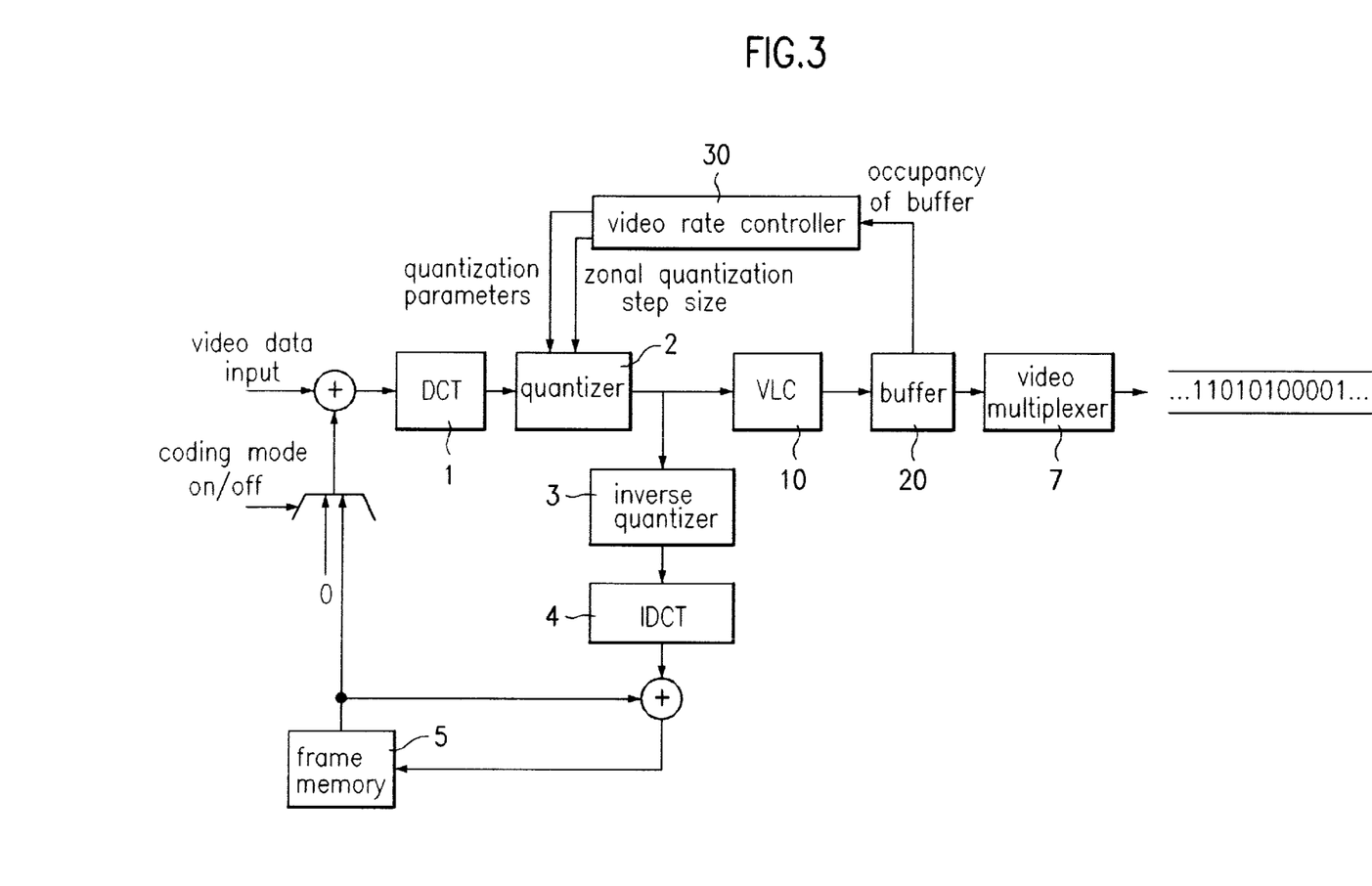
FIG. 3 is a block diagram showing a video data compression apparatus according to the present invention.

FIG. 3 shows a video data compression apparatus according to the present invention comprising a DCT unit 1 inputting macro block-unit video data before compression, a quantizer 2, an inverse quantizer 3, an IDCT 4, and frame memory 5 for video storage. The video data compression apparatus further comprises a VLC 10 converting video data quantized by the quantizer 2 into variable-length data; a buffer 20 functioning as the single input/output port for transmitting compressed video data from the VLC 10; a video multiplexer 7 multiplexing output video data from the buffer 20; and a video rate controller 30 varying a quantization coefficient Q (k) according to an occupancy of the buffer 20.

The DCT unit 1 may be replaced with any other discrete orthogonal transform unit having the same function. For example, the DCT unit 1 may be replaced with any one of a discrete sine transform, a Hadamard transform, a KL transform or a Walsh transform units.

The video data compression apparatus in FIG. 3 is substantially the same in construction as the video data compression apparatus in FIG. 1, with the exception that the buffer 20 has a different internal structure from the buffer 8 and a further control parameter is fed back. Also, the video rate controller 30 applies a zonal quantization parameter as well as the quantization step size to the quantizer 2 according to the occupancy of the buffer 20. The zonal quantization parameter is a value for designating a position of a DCT coefficient to be quantized by the quantizer 2. As a result, the DCT range to be quantized by the quantizer 2 is controlled based upon the zonal quantization parameter.

The occupancy of the conventional buffer is an instantaneous value adaptive only to an absolute memory size.

However, the occupancy of the present buffer is flexible.

Figure 4:
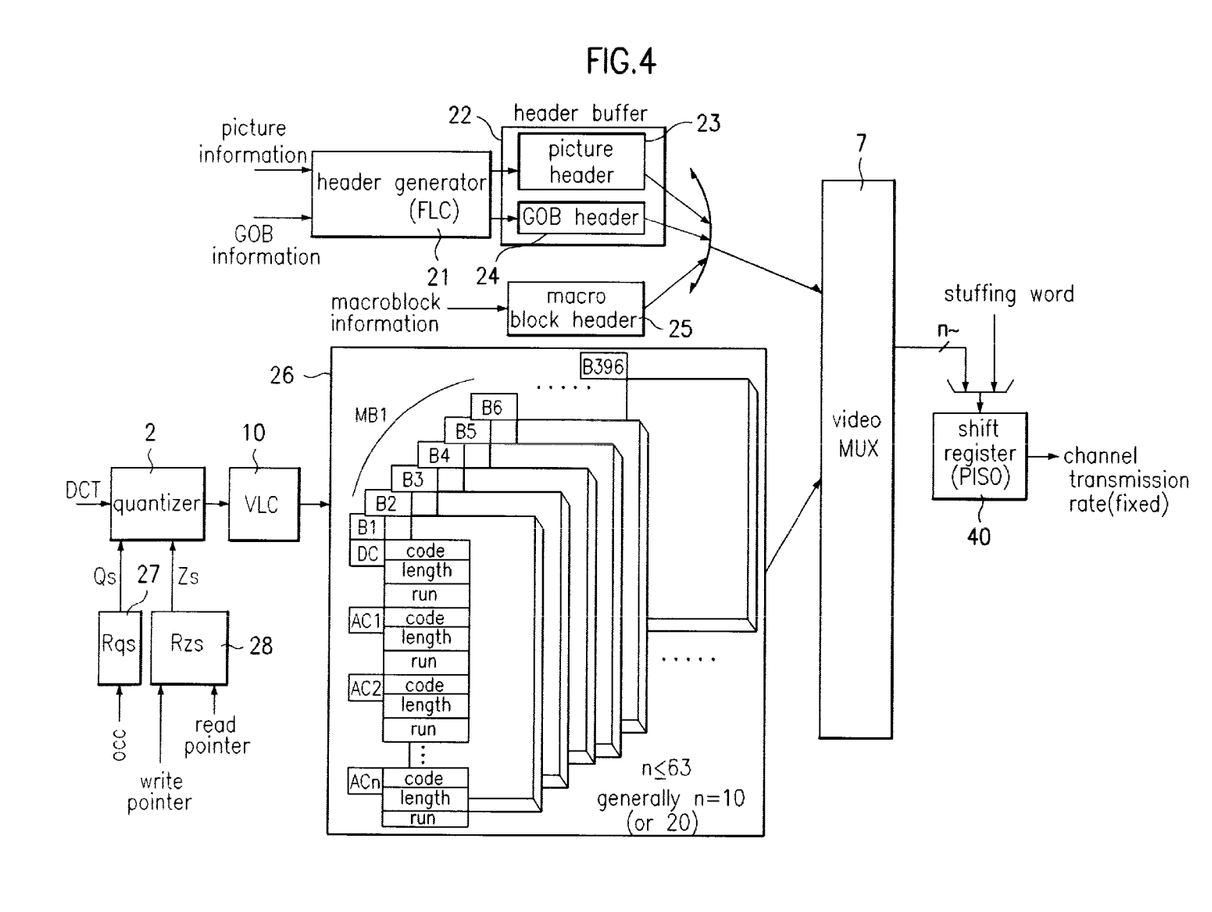
FIG. 4 is a block diagram showing an internal structure of a buffer in FIG. 3.

As shown in FIG. 4, the present buffer is configured, not in a FIFO memory manner, but in a manner in which the memory locations are divided according to variable-length elements. This division defines the boundary between input variable-length codes and allows individual accesses to the divided memory locations.

FIG. 4 shows an internal structure of the buffer 20 in FIG. 3. A header buffer 22 separately stores a picture header 23 and group of block (GOB) header 24. A macro block header unit 25 also separately stores a variable-length code of a macro block header. In the preferred embodiment, a CONTRAXPAND™ buffer 26 is used as the kernel of the present buffer 20.

The CONTRAXPAND™ buffer 26 includes a plurality of blocks, each of which has code regions for storing variable-length codes from the VLC 10, length regions for indicating bit lengths of the code regions, and run regions for indicating the number of direct current (DC) components or alternating current (AC) components of the corresponding block which have quantized values of 0. Noticeably, the CONTRAXPAND™ buffer 26 does not store components which were not quantized.

For example, if the first, second and eleventh of a DC component and AC components arranged in the zigzag scanning order have quantized values other than 0, the components are stored and output in the regions AC1, AC2 and AC3 of the block 1 in the CONTRAXPAND™ buffer 26. Alternatively, the DC and AC components may be stored with a one-to-one correspondence to a DC and an AC regions in the buffer 20, even if they have quantized values other than 0. For a more efficient construction of the buffer 20, flag bits may be separately stored indicating whether the values stored in the DC and AC regions in the buffer 20 are 0. The picture header unit 23 and the GOB header unit 24 are not included in the CONTRAXPAND™ buffer 26 because they store fixed-length codes.

Also, a read pointer and a write pointer are implemented with the CONTRAXPAND™ buffer 26 to control the quantizer 2. Particularly, the video rate controller 9 includes an Rqs controller 27 controlling the quantization step size Qs according to the occupancy of the buffer 20 and applying Qs to the quantizer 2. The video rate controller 9 further includes an Rzs controller 28 controlling a zonal sampling parameter Zs according to the read pointer and write pointer of the buffer 20 and applying Zs to the quantizer 2. The zonal sampling parameter Zs is an index of a DCT coefficient to be quantized.

Another aspect of the video data buffering method of the present invention as shown in FIG. 4 is to output variable-length video data from the VLC 10 adaptively to a state of a communication channel and/or the picture frame rate. This can be achieved by dividing and storing the video data according to the positions of DC and AC values. Particularly, the data of lower importance among the video data stored in the buffer 20 may be abandoned in transmission.

Rather than remedying an overflow due to a high occupancy of the buffer 20, the present invention selectively transmits data of higher importance among the quantized DCTs (DCTQs) stored in the buffer 20 while abandoning the remaining DCTQs.

Figure 5:
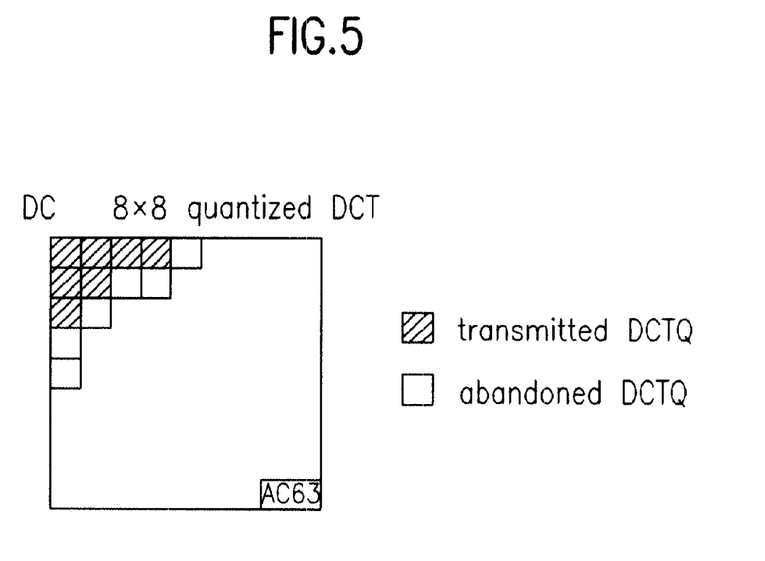
FIG. 5 shows a status of the DCT quantized video data according to the present invention.

FIG. 5, shows the "transmitted" DCTQs among all DCTQs processed by the VLC 10. Thus, a potential overflow may be prevented and the transmission can continuously be maintained even at the higher occupancy state. As s result, the degradation in the picture quality is distributed to the surroundings.

The selective transmission can be performed according to the read range obtained by the read pointer and write range obtained by the write pointer. The write range is the level of data written into the buffer 8 and is dependent upon the output level of the quanizer 2. The read range is the level of data read from the buffer 8 and is a function of both the channel transmission rate and/or the picture frame rate. As the channel transmission rate and the picture frame rate fluctuates, the output level or the read range is controlled by the selective transmission.

After a selective transmission, a difference between the transmitted DCTQs and the abandoned DCTQs is transferred to the Rzs controller 28 by the read pointer and the write pointer. As a result, the quantizer 2 is controlled in response to the zonal sampling parameter Zs and quantization step size Qs in such a manner that the occupancy of the buffer 20 can rapidly be readjusted to a lower value such that a difference between the read pointer and write pointer can become 0. At this time, the quantization parameter Qs (k) and the zonal sampling parameter Zs (k) can be expressed by the following equations:

$$Qs\ (k)=f(occ(k)): \text{function } f(\ ),\ \text{Linear or Non-Linear } occ\ (k)=rbn\ (k)-wbn\ (k)$$

where, "occ (k)" is the occupancy of the buffer, "rbn (k)" is a $$rbn(k) = \sum_{\substack{j=0,\ jread \\ k=k1,k2}} length\ (Bk,\ j)$$

$$wbn(k) = \sum_{\substack{j=0,\ jwrite \\ k=k3,k4}} length\ (Bk,\ j)$$

read block number, "wbn (k)" is a write block number, "$j_{read}$" and "$j_{write}$" are positions of read and write codes respectively, and "$k_{1,2,3,4}$" is a block position.

The function f (occ(k)) is used to change the occupancy occ (k) of the buffer to Qs (k). This function f (occ(k)) may be of various types according to video data amount control methods. A linear function or sigmoidal function is generally used as the function f (occ(k)). Alternatively, a unimoidal function, which is a combination of logarithmic and exponential functions, may also be used as the function f (occ(k)).

Also the zonal sampling parameter Zs (k) can be expressed as follows,

Zs (k)=q (dptr (k))
wptr (k)=Σrun (Bk)
rptr (k)=Σrun (Bk)
dptr (k)=int{(wptr (k)-rptr (k))/NMB} where, "rptr (k)" is the read pointer, "wptr (k)" is the write pointer, "dptr (k)" is a difference between the read pointer and the write pointer, "NMB" is the total number of blocks in each macro block of the buffer 20, "int" signifies the use of an integer, and "run" signifies the number of preceding zeros of a non-zero DCT coefficient.

The "write block" signifies the total number of DC to ACn components stored in each block in each macro block of the buffer 20, and the "read block" signifies the total number of DC to ACn components output from each block in each macro block of the buffer 20.

Also, the "rptr (k)", "wptr (k)" and "dptr (k)" are binary addresses. The "occ (k)" is determined according to the size of the CONTRAXPAND™ buffer 26 of the buffer 20. This "occ (k)" can be expressed by either an integer or a real number according to the embodiments. In the preferred embodiment, "Zs (k)" is at least one of integers from 1 to 63.

The video data from the buffer 20 are multiplexed by the video multiplexer 7 and output according to a bit stream syntax. The output variable-length codes from the video multiplexer 7 are passed through a parallel-in serial-output (PISO) shift register allowing the codes to be transmitted as one bit stream according to the speed of a connected channel.

Figure 6:
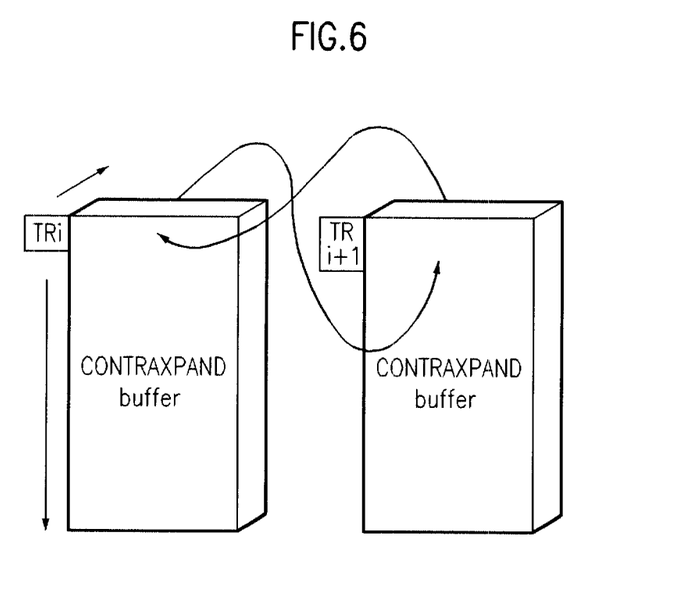
FIG. 6 is a schematic view illustrating an interconnection between a plurality of buffers according to the present invention.

Referring to FIG. 6, the buffer 20 may be provided with a plurality of CONTRAXPAND™ buffers 26 to increase the entire buffer capacity. With an increased buffer capacity, a data write operation is performed with respect to one buffer while a data read operation is performed with respect to another buffer. The value "TR" is a temporal reference corresponding to a time stamp, which has any integer within the range from 0 to 255.

Figure 7:
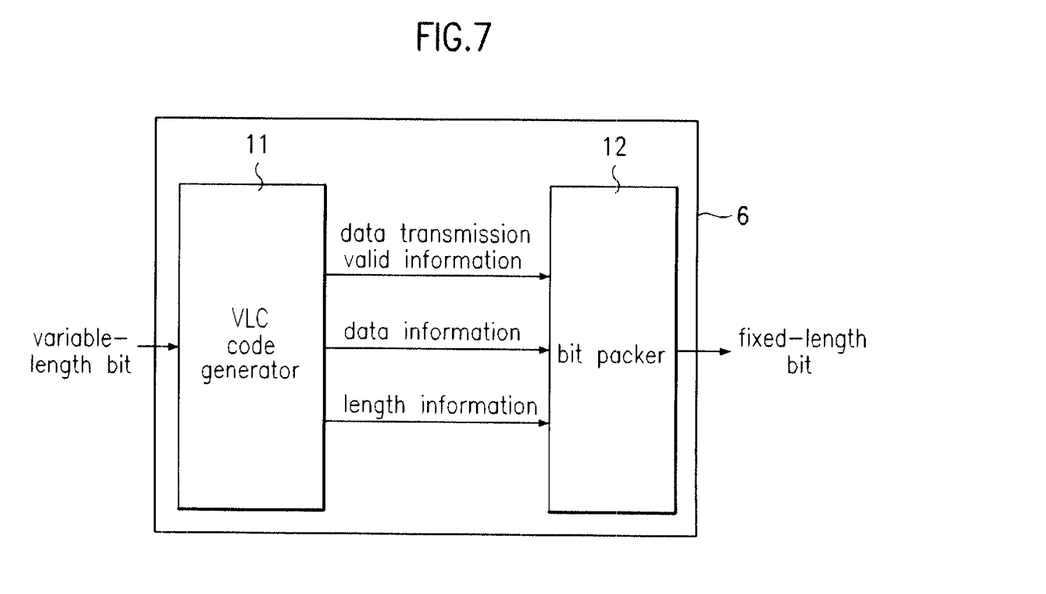
FIG. 7 is a view showing an internal structure of a general variable length coder.

FIG. 7 shows a general VLC including a bit packer for converting variable-length codes into fixed-length codes. If the general VLC does not include a bit packer, connection with a clock signal to connect with a communication channel cannot easily be performed. For this reason, a bit packer is conventionally used in implementing the VLC. However, in the video data compression apparatus of the present invention, the VLC need not include the bit packer because the buffer 20 is able to buffer the variable-length code data. According to the present invention, the final bit stream output is connected to the communication channel, even without a bit packer in the VLC.

Figure 8:
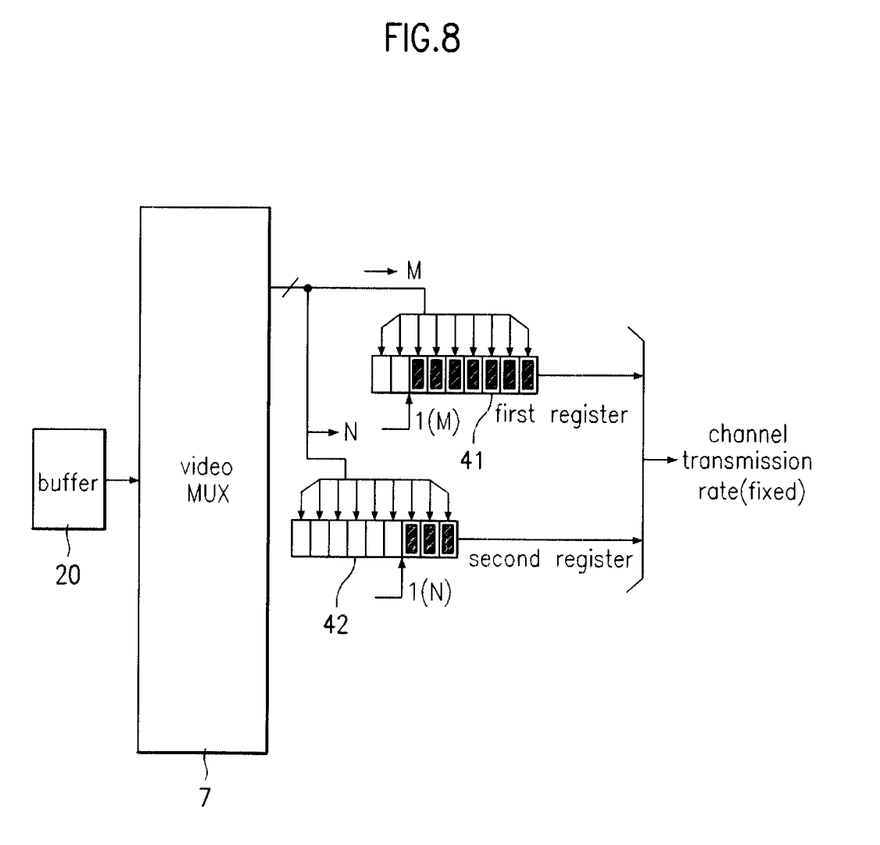
FIG. 8 is a view illustrating the transfer of video data from the buffer in FIG. 3 to a communication channel.

Referring to FIG. 8, variable-length codes M and N with lengths of I (M) and I (N) are multiplexed by the video multiplexer 7 and output respectively to a first and a second registers 41 and 42 in a shift register 40. The length information I (M) and I (N) indicating the lengths of the codewords are transferred respectively to the first and second registers 41 and 42. As a result, a bit stream corresponding to the transferred length information is output in response to a clock which is synchronized with an output channel.

Thus, a 7-bit output is provided by the first register 41 and a 3-bit output is provided by the second register 42. Such operation is continuously performed with respect to all the subsequent input data, thereby the final output is not disconnected with the communication channel. Moreover, this operation can be achieved without using a bit packer which occupies more than half of the function of the VLC, resulting in a reduction in the complexity of the VLC.

As discussed above, according to the present invention, a potential overflow in the buffer of a video data compression apparatus is prevented. Thus, a communication discontinuance cannot occur in the entire system. Because the input/output operation is not performed in the FIFO manner, the variable-length code information can selectively be transmitted even after the coding is performed. The current input data is not limited to being transmitted only after transmitting the previously stored data. Therefore, the transfer delay can be minimized, resulting in an increase in quality of video communication.

Moreover, the complexity of the VLC can be reduced to less than half of the conventional VLC, relatively reducing the complexity of the buffer. Therefore, the entire system can be simplified in construction. Moreover, the mutual relation between the quantizer and the VLC is used to control the entire system according to the state of the transmission channel. This increases the communication quality as compared with the conventional apparatus where the transmission rate is controlled depending on the quantizer. Furthermore, because the variable-length video data are separately processed, the present invention can efficiently be coupled with any other technique capable of maintaining a high error resilience under a communication channel environment where a bit error generation rate is high.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of buffering video data in a video compression system, comprising: Storing variable length coded video data outputted from a variable length coder (VLC) into a buffer as block units according to the variable length of the video data, wherein the buffer is divided into memory locations according to variable length elements of the video data, and wherein each memory location is individually accessible, and wherein the buffer comprises at least one main buffer having a plurality of code regions, a plurality of length regions, and a plurality of run regions, and wherein the variable length coded video data is stored in said at least one main buffer.

2. The method of claim 1, further comprising separately storing a group of block header.

3. The method of claim 1, further comprising separately storing a variable length code of a block header.

4. The method of claim 1, wherein the buffer comprises at least one main buffer having a plurality of code regions, a plurality of length regions, and a plurality of run regions, and wherein the variable length coded video data is stored in said at least one main buffer.

5. The method of claim 4, further comprising:
storing variable length codes in prescribed code regions of the main buffer;
storing bit lengths of the code regions in length regions of the main buffer; and
storing a number of direct current components and a number of alternating current components of the corresponding block unit having quantized values of 0 in run regions of the main buffer.

6. The method of claim 5, further comprising:
storing direct current components in a DC region of the main buffer; and
storing alternating current components in an AC region of the main buffer.

7. The method of claim 6, further comprising separately storing flag bits indicating whether the values stored in the DC region and the AC regions are 0.

8. The method of claim 1, further comprising transmitting from the buffer the variable length video data blocks of higher importance and abandoning the remaining variable length video data blocks, depending upon values of a read pointer and a write pointer.

9. The method of claim 8, further comprising:
controlling the video data output level of a quantizer according to a quantization step size and according to a zonal quantization parameter by eliminating a difference between the transmitted and the abandoned variable length video data blocks; and
variable length coding the video data output by the quantizer and outputting variable length video data.

10. The method of claim 4, wherein the buffer comprises a plurality of main buffers, each main buffer having a plurality of code regions, a plurality of length regions, and a plurality of run regions, and wherein the variable length coded video data is stored in said plurality of main buffers.

11. A method of buffering video data in a video compression system, comprising: (a) controlling the video data output level of a quantizer according to a quantization coefficient and a zonal quantization parameter; (b) variable length coding the video data output by the quantizer and outputting variable length video data; and (c) storing into a buffer the variable length video data in block units according to the variable length of the video data, wherein the buffer is divided into memory locations according to variable length elements of the video data, and wherein each memory location is individually accessible, and wherein the buffer comprises at least one main buffer having a plurality of code regions, a plurality of length regions, and a plurality of run regions, and wherein the variable length coded video data is stored in said at least one main buffer.

12. The method of claim 11, wherein step (a) further comprises varying the quantization coefficient as a function of the occupancy of said buffer.

13. The method of claim 12, wherein the function is one of a linear function, a sigmoidal function, or a unimoidal function.

14. The method of claim 11, wherein in step (a) the zonal quantization parameter controls a discrete cosine transform range to be quantized by the quantizer.

15. A video compression system, comprising: a discrete cosine transform (DCT) unit to perform a discrete cosine transform of input video data and output DCT video data; a quantizer coupled to quantize the DCT video data according to quantizing control signals and output DCT video data; a video rate controller coupled to the quantizer to control the DCT video data output level of the quantizer by outputting at least one quantizing control signal; a variable length coder (VLC) coupled to receive and variable length encode the DCTQ video data and output variable length video data; a buffer coupled to the VLC to receive and store the variable length video data in block units according to the variable length of the video data and provide a feedback signal to the video rate controller; and a multiplexer coupled to receive an output of the buffer and multiplex the variable length video data from the buffer, wherein the buffer is divided into memory locations according to variable length elements of the video data, and wherein each memory location is individually accessible, and wherein the buffer comprises at least one main buffer having a plurality of code regions, a plurality of length regions, and a plurality of run regions, and wherein the variable length coded video data is stored in said at least one main buffer.

16. The system of claim 15, wherein the video rate controller comprises a Rqs unit configured to vary a quantization step size as a function of an occupancy of the buffer, wherein the quantization step size is output as the at least one quantizing control signal.

17. The system of claim 16, wherein the video rate controller further comprises a Rzs unit configured to vary a zonal quantization parameter according to inputs from a read pointer and a write pointer wherein the at least one quantizing control signal includes the quantization step size and the zonal quantization parameter.

18. The system of claim 15, further comprising a shift register configured to output the multiplexed variable length video data according to a state of a transmission channel.

19. The system of claim 15, wherein the buffer comprises:
a header buffer to separately store a picture header and a group of block header; and
a macro block header buffer to separately store a variable length code of a block header.

20. The system of claim 19, wherein the buffer further comprises at least one main buffer configured to store the variable length video data, wherein the main buffer comprises a plurality of buffer units, each buffer unit having code regions for storing variable-length codes received from the VLC, length region to indicate bit lengths of the code regions, and run regions to indicate at least one of a number of direct current components and alternating current components of a corresponding buffer unit that has quantized values of 0.

21. The system of claim 15, wherein the buffer outputs the variable length video data blocks of higher importance and abandons the remaining variable length video data blocks in accordance with a value of a read pointer and a write pointer.

22. The method of claim 1, further comprising providing a first output of the buffer to a video multiplexer, and providing a second output of the buffer to a video rate controller.

23. The method of claim 22, wherein the video rate controller generates at least one quantization parameter and a zonal quantization step size in response to the second output of the buffer.

24. The method of claim 23, wherein the second output includes an occupancy level of the buffer.

25. The method of claim 1, wherein the data stored in the buffer is ranked according to importance, and wherein the buffer selectively outputs data of a higher importance as compared to other stored data to remedy an overflow condition due to a high occupancy of the buffer.

26. The method of claim 25, wherein data of a lower importance is abandoned during an overflow condition.

27. The method of claim 26, wherein after the selective output, a difference between the transmitted data and the abandoned data is transferred to a video rate controller to generate at least one control signal to rapidly adjust a quantization step size of a quantizer.

28. The method of claim 27, wherein the at least one control signal comprises a quantization parameter $Q_s(k)$ and a zonal sampling parameter $Z_s(k)$ wherein the quantization parameter $Q_s(k)$ controls a quantization step size in accordance with an occupancy of the buffer, and wherein the zonal sampling parameter is an index of the data to be quantized and corresponds to a read pointer and a write pointer of the buffer.

29. The method of claim 11, further comprising providing a first output of the buffer to a video multiplexer, and providing a second output of the buffer to a video rate controller.

30. The method of claim 29, wherein the video rate controller generates at least one quantization parameter and a zonal quantization step size in response to the second output of the buffer.

31. A method of buffering video data in a video compression system, comprising: receiving variable length coded data from a variable length coder (VLC); storing the variable length coded data in a buffer as block units according to the variable length of the video data, wherein the buffer provides a feedback signal to a video rate controller and provides an output signal to a video multiplexer, wherein the buffer is divided into memory locations according to variable length elements of the video data, and wherein each memory location is individually accessible, and wherein the buffer comprises at least one main buffer having a plurality of code regions, a plurality of length regions, and a plurality of run regions, and wherein the variable length coded video data is stored in said at least one main buffer.

32. The method of claim 31, wherein s buffer occupancy is controlled in accordance with an occupancy of the buffer and a value of a buffer read pointer and a buffer write pointer.

33. The method of claim 31, wherein the video rate controller provides a quantization step parameter and a zonal quantization parameter to a quantizer, and wherein the quantization step parameter and the zonal quantization parameter are determined in accordance with the feedback signal from the buffer.

34. A video compression system, wherein the improvement comprises a video data buffer, having: a header buffer, configured to store a picture header and a group block header; a macro block header buffer, to store a variable length code of a macro block header; a main buffer, coupled to receive encoded video data from a variable length coder, configured to store video data according to variable length elements such that a boundary is formed between variable length codes, and such that the divided memory locations can be accessed individually, wherein the buffer is divided into memory locations according to variable length elements of the video data, and wherein each memory location is individually accessible, and wherein the buffer comprises at least one main buffer having a plurality of code regions, a plurality of length regions, and a plurality of run regions, and wherein the variable length coded video data is stored in said at least one main buffer.

35. The buffer of claim 34, further comprising a variable length coder (VLC) coupled to provide an input signal to the buffer, and a video multiplexer coupled to receive an output of the video buffer.

36. The buffer of claim 35, further comprising a video rate controller, coupled to receive a feedback signal from the buffer and generate a first and second control signal.

37. The system of claim 36, wherein the first control signal is a quantization step parameter and the second control signal is a zonal quantization parameter, and wherein both control signals are provided to a quantizer.

38. The system of claim 34, wherein the video data buffer is coupled to receive output data from a variable length coder, and coupled to provide a buffer output to a multiplexer.

39. The method of claim 4, wherein the main buffer comprises:
a plurality of buffer units, each buffer unit having code regions for storing variable-length codes received from the VLC, length region to indicate bit lengths of the code regions, and run regions to indicate at least one of a number of direct current components and alternating current components of a corresponding buffer unit that has quantized values of 0.

40. The method of claim 39, wherein the main buffer stores only values that have been quantized.

41. The method of claim 1, wherein data of higher importance is transmitted from the buffer and data of lower importance is discarded when an overflow condition occurs.

42. The method of claim 1, wherein the division between memory locations in the buffer defines a boundary between input variable length codes and allows for individual access to the divided memory locations.

43. The method of claim 1, wherein the variable length coded video data stored in each memory region of the buffer can be individually accessed.

44. The method of claim 1, wherein variable length coded video data can be selectively transferred out of the buffer irrespective of an order in which it is received into the buffer among a plurality of variable length coded video data.

45. The method of claim 11, wherein data of higher importance is transmitted from the buffer and data of lower importance is discarded when an overflow condition occurs.

46. The system of claim 5, wherein data of higher importance is transmitted from the buffer and data of lower importance is discarded when an overflow condition of the buffer occurs.

47. The method of claim 31, wherein data of higher importance is transmitted from the buffer and data of lower importance is discarded when an overflow condition occurs.

48. The system of claim 34, wherein data of higher importance is transmitted from the buffer and data of lower importance is discarded when an overflow condition of the main buffer occurs.

* * * * *